(12) United States Patent
Towfiq

(10) Patent No.: US 12,316,509 B2
(45) Date of Patent: *May 27, 2025

(54) NETWORK MANAGEMENT

(71) Applicant: Promptlink Communications, Inc., Oceanside, CA (US)

(72) Inventor: Foad Towfiq, Oceanside, CA (US)

(73) Assignee: Promptlink Communications, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,730

(22) Filed: Jun. 28, 2023

(65) Prior Publication Data

US 2024/0179077 A1  May 30, 2024

Related U.S. Application Data

(63) Continuation of application No. 17/543,545, filed on Dec. 6, 2021, now Pat. No. 11,736,368, which is a continuation of application No. 16/708,276, filed on Dec. 9, 2019, now Pat. No. 11,196,642.

(60) Provisional application No. 62/777,226, filed on Dec. 9, 2018.

(51) Int. Cl.
*G06F 15/16* (2006.01)
*H04L 41/147* (2022.01)
*H04L 41/149* (2022.01)
*H04L 41/22* (2022.01)
*H04L 41/50* (2022.01)
*H04L 41/5009* (2022.01)
*H04L 41/5025* (2022.01)
*H04L 43/04* (2022.01)

(52) U.S. Cl.
CPC ......... *H04L 41/147* (2013.01); *H04L 41/149* (2022.05); *H04L 41/22* (2013.01); *H04L 41/5009* (2013.01); *H04L 41/5025* (2013.01); *H04L 41/5032* (2013.01); *H04L 43/04* (2013.01)

(58) Field of Classification Search
CPC . H04L 41/22; H04L 41/5009; H04L 41/5025; H04L 41/5032; H04L 43/04
USPC ....................................................... 709/224
See application file for complete search history.

(56) References Cited

U.S. PATENT DOCUMENTS

| | | | |
|---|---|---|---|
| 6,571,285 B1 | 5/2003 | Groath et al. | |
| 6,895,382 B1 | 5/2005 | Srinivasan et al. | |
| 6,985,901 B1 | 1/2006 | Sachse et al. | |
| 7,023,798 B2 * | 4/2006 | Bourlas | H04W 72/52 370/465 |
| 7,289,467 B2 * | 10/2007 | Bourlas | H04W 72/52 370/465 |

(Continued)

FOREIGN PATENT DOCUMENTS

EP  2984787 A1  2/2016

OTHER PUBLICATIONS

Non-Final Office Action received for U.S. Appl. No. 17/543,545, mailed on Nov. 17, 2022, 7 pages.

(Continued)

*Primary Examiner* — Moustafa M Meky
(74) *Attorney, Agent, or Firm* — DLA Piper LLP (US)

(57) ABSTRACT

Various techniques include identifying impairments in networks, prioritizing the impairments, and prioritizing fixing the impairments to reduce negative impacts on network customers.

18 Claims, 17 Drawing Sheets
(16 of 17 Drawing Sheet(s) Filed in Color)

(56) References Cited

U.S. PATENT DOCUMENTS

| | | | |
|---|---|---|---|
| 7,383,191 B1 | 6/2008 | Herring et al. | |
| 7,529,204 B2 * | 5/2009 | Bourlas | H04W 72/52 370/465 |
| 8,213,359 B2 * | 7/2012 | Bourlas | H04W 72/52 370/465 |
| 8,248,031 B2 | 8/2012 | Yamasaki et al. | |
| 8,537,757 B2 * | 9/2013 | Arviv | H04W 72/52 370/465 |
| 8,699,321 B2 * | 4/2014 | Bugenhagen | H04L 43/0811 370/216 |
| 9,007,891 B2 * | 4/2015 | Bugenhagen | H04L 47/122 370/216 |
| 9,297,723 B1 | 3/2016 | Hofmann et al. | |
| 9,413,597 B2 | 8/2016 | Bishop et al. | |
| 9,723,557 B2 | 8/2017 | Mclaughlin | |
| 10,367,706 B2 | 7/2019 | Beattie et al. | |
| 10,491,500 B2 * | 11/2019 | Bugenhagen | H04L 41/5025 |
| 10,652,117 B2 * | 5/2020 | Burg | H04L 41/5032 |
| 10,848,398 B2 * | 11/2020 | Rhee | H04L 1/20 |
| 11,196,642 B2 * | 12/2021 | Towfiq | H04L 43/04 |
| 11,736,368 B2 * | 8/2023 | Towfiq | H04L 41/5025 709/224 |
| 2006/0233313 A1 | 10/2006 | Adams et al. | |
| 2008/0215355 A1 | 9/2008 | Herring et al. | |
| 2008/0313491 A1 | 12/2008 | Adams et al. | |
| 2009/0309419 A1 | 12/2009 | Yamasaki et al. | |
| 2017/0142654 A1 | 5/2017 | Mclaughlin | |
| 2018/0145873 A1 | 5/2018 | Beattie et al. | |
| 2018/0278742 A1 | 9/2018 | Gedge et al. | |
| 2020/0148552 A1 | 5/2020 | Mzhack et al. | |
| 2020/0186440 A1 | 6/2020 | Towfiq | |
| 2022/0166688 A1 | 5/2022 | Towfiq | |

OTHER PUBLICATIONS

Notice of Allowance received for U.S. Appl. No. 17/543,545, mailed on Mar. 29, 2023, 8 pages.

International Preliminary Report on Patentability received for PCT Patent Application No. PCT/US2019/065302, mailed on Jun. 24, 2021, 11 pages.

International Search Report and Written Opinion received for PCT Patent Application No. PCT/US2019/065302, mailed on Mar. 30, 2020, 15 pages.

Non-Final Office Action received for U.S. Appl. No. 16/708,276, mailed on Apr. 29, 2021, 8 pages.

Notice of Allowance received for U.S. Appl. No. 16/708,276, mailed on Sep. 8, 2021, 8 pages.

Invitation to Pay Additional Fees and Partial International Search Report received for PCT Patent Application No. PCT/US2019/065302, mailed on Feb. 4, 2020, 8 pages.

Office Action received for Mexican Patent Application No. MX/a/2021/006658, mailed on May 30, 2024, 4 pages (Official Copy Only). {See communication under 37 CFR § 1.98(a) (3)}.

* cited by examiner

NETWORK MANAGEMENT

CROSS-REFERENCE TO RELATED APPLICATIONS

This application is a Continuation of U.S. patent application Ser. No. 17/543,545, entitled "NETWORK MANAGEMENT" filed on Dec. 6, 2021, which is a Continuation of U.S. patent application Ser. No. 16/708,276, entitled "NETWORK MANAGEMENT," filed on Dec. 9, 2019 and issued as U.S. Pat. No. 11,196,642, which claims priority to U.S. Provisional Patent Application Ser. No. 62/777,226, entitled "NETWORK MANAGEMENT" filed on Dec. 9, 2018, the contents of which are hereby incorporated by reference in their entireties.

FIELD

The present disclosure relates generally to network management, and more specifically to techniques for identifying and prioritizing impairments of a network.

BACKGROUND

Service providers (e.g., operators) provide customers (e.g., subscribers) with services, such as multimedia, audio, video, telephony, data communications, wireless networking, and wired networking. Service providers provide such services by deploying one or more electronic devices at their customers' premises, and then connecting the deployed electronic device to the service provider's network or infrastructure. The deployed electronic devices are often called Customer Premise Equipment (CPE). For example, a cable company delivers media services to customers by connecting an electronic device, such as a set-top box or a cable modem, located at customer's premise to the cable company's network. This CPE is the device that the service provider uses to deliver the service to the customer.

Networks, such as those maintained by service providers or their customers, may have impairments, which can cause service degradation and customer dissatisfaction. Examples of impairments include loose or corroded connectors, damaged cables, and flooded amplifier. Over time, as the network ages, the severity and number of impairments increase. Service providers face challenges in identifying these impairments and fixing them in a timely manner so as to limit the impacts of service degradation or outage of their customers.

BRIEF SUMMARY

Some techniques for identifying and prioritizing impairments of a network, however, are unreliable or inaccurate. For example, some techniques do not identify certain types of impairments. For another example, some techniques do not prioritize the repair of impairments based on the severity of the impairments and/or the number of affected customers.

In accordance with some embodiments, a method for identifying a cause of an impairment in a network is described. The method comprises: receiving one or more historical network performance parameters for a plurality of CPE devices of a geographical location, the one or more historical network performance parameters corresponding to particular days or times; receiving data corresponding to a plurality of environmental factors for the geographical location, the plurality of environmental factors for the geographical location corresponding to the particular days or times; analyzing the one or more historical network performance parameters to identify a degradation in the quality of services for the plurality of CPE devices; determining that the degradation in the quality of services correlates to a change in one or more environmental factors of the plurality of environmental factors for the geographical location; and identifying the one or more environmental factors as a cause for the degradation in the quality of services.

In accordance with some embodiments, a method for prioritization of network maintenance based on weather forecast is described. The method comprises: accessing a plurality of items corresponding to network maintenance tasks, the plurality of items including a first item corresponding to a first network maintenance tasks and a second item corresponding to a second network maintenance task different from the first network maintenance task; receiving a weather forecast; and prioritizing, based on the weather forecast, the plurality of items corresponding to network maintenance tasks.

DESCRIPTION OF THE FIGURES

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
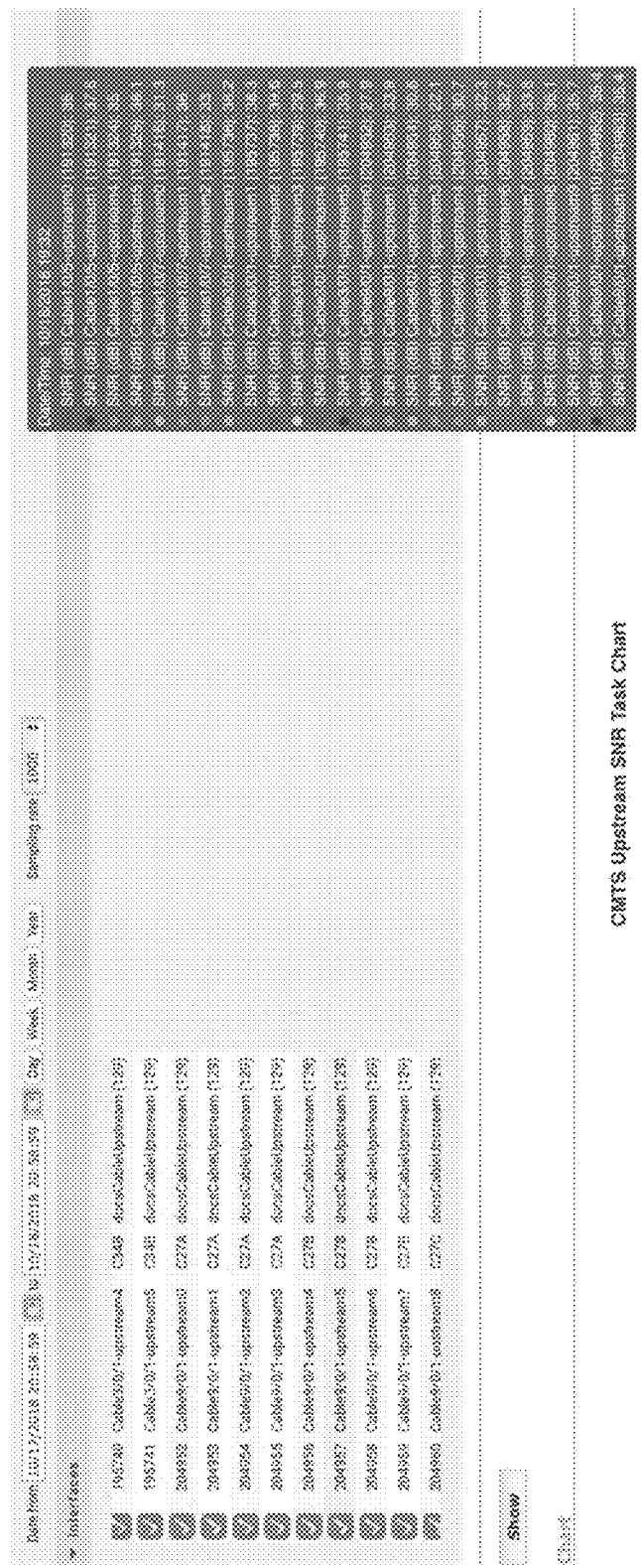
FIG. 1 illustrates an upstream Signal to Noise Ratio (SNR) for multiple upstream channels, in accordance with some examples.
Figure 1:
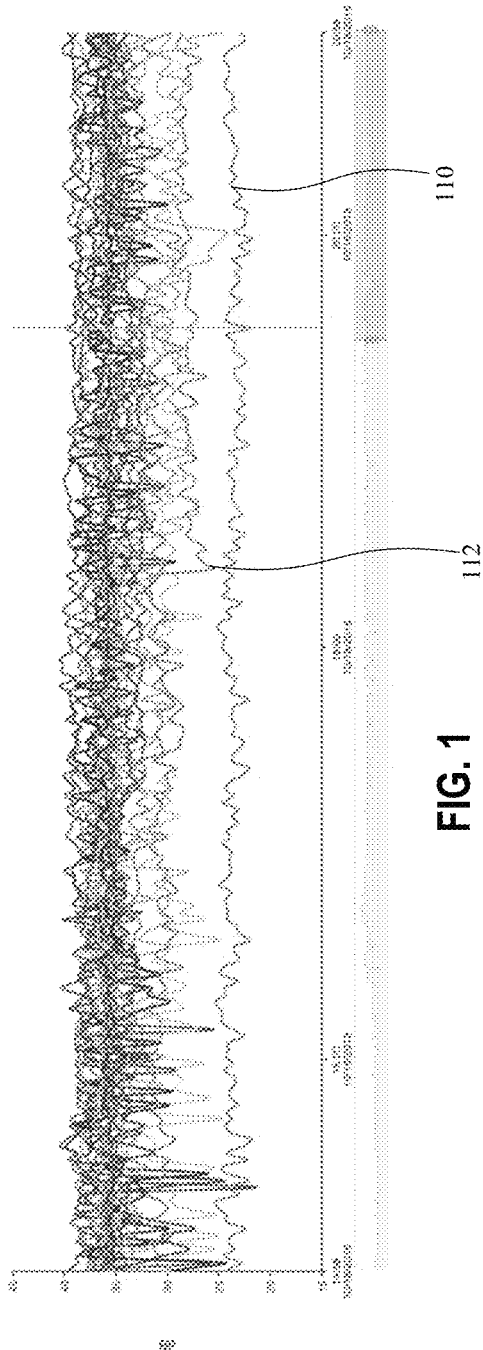

The following description sets forth exemplary methods, parameters, and the like. It should be recognized, however, that such description is not intended as a limitation on the scope of the present disclosure, but is instead provided as a description of exemplary embodiments.

The number of impairments in a cable network and the number of areas that need attention is often very numerous.

Therefore, operators would benefit from techniques that properly prioritize and schedule which impairments are more critical and need to be fixed first.

The severity of the impairments are sometimes intensified by external events or factors. For example, a defective gas-discharge street light, which regularly turns on at sunset, may introduce noise in the network through a loose connector. This noise goes away at sunrise when the defective street light turns off. For an example in rainy weather conditions, rain may flood an amplifier or other network element with defective moisture insulation, resulting in a service degradation or outage.

The described techniques use network performance parameters (e.g., cable network parameters), such as Upstream and Downstream Power levels and Signal to Noise Ratios (SNR), Bit Error Rate (BER), Codeword Error Rate (CER), Pre-equalization coefficients, Full Band Capture, and/or Upstream Spectrum, to estimate the performance of various CPE devices and to determine a performance score for different parameters (or types of impairments) for the various CPE devices. Often times, all CPEs devices impacted by the same impairment behave the same (or similar) way and the performance scores determined for such CPE devices would be similar. This is also generally true for the Pre-equalization and other Proactive Network Maintenance (PNM) parameters, such as Frequency Response, and Impulse Noise. Using performance scores for each type of impairment, the described techniques correlate the CPE devices behaving the same (or similar) way in a group.

Accordingly, these techniques provide the ability to analyze CPE devices to identify which impairments are having more significant impacts on the health of the network and to identify (or narrow) the cause(s) and the location(s) of the impairments.

Further, these techniques obtain and use information related to external events (e.g., external to the network). For example, the technique optionally tracks the CPE performance scores as a function of the time of the day and/or sunrise/sunsets. For another example, the technique tracks CPE performance scores as a function of weather conditions. If the performance score of a group of modems in an area (e.g., a geographical area, a network group) is determined to be negatively affected by an external effect, then a forecast of that external event will increase the priority of fixing the corresponding impairment that is causing the negative change in performance.

In some examples, the technique detects/determines and set priorities for fixing different impairments in a network (e.g., a cable network). As part of the detection and prioritization process, the technique analyzes and provides a score for the health of various CPE devices (e.g., all accessible CPE devices in a group) in the network.

A CPE may exhibit poor performance because of (1) one or more network issues, (2) defects of the CPE itself, or (3) a combination thereof. This technique takes into account the performance score of each CPE device and performance scores of neighboring CPE devices to determine a health score for the CPE or all the CPEs. Frequently, the health score of a CPE is different from the performance score of the same CPE.

Field technicians (e.g., deployed by the service provider) often swap out the subscribers' CPE devices for different CPE devices while trying to diagnose the issue. This process of swapping out CPE devices adds to the significant number of field return CPEs, which increases costs in the Clean & Screen operation portion of the service provider. Providing the field technique with an accurate health score for the CPE in question will allow the field technician to make an informed decision on whether the CPE is defective, thereby eliminating or reducing the unnecessary replacement of properly functioning CPEs.

FIG. 1 illustrates an upstream Signal to Noise Ratio (SNR) on Oct. 18, 2018, from 14:58 to 20:58 for multiple upstream channels. Each element in the graph of FIG. 1 corresponds to one upstream channel. The graph shows that one of the channels (corresponding to element 110) has low SNR which is representative of high noise in that channel. The graph also shows a second channel (corresponding to element 112) that has good SNR until 18:20 (pm), after which the SNR drops, indicating presence of noise after this time.

Figure 2:
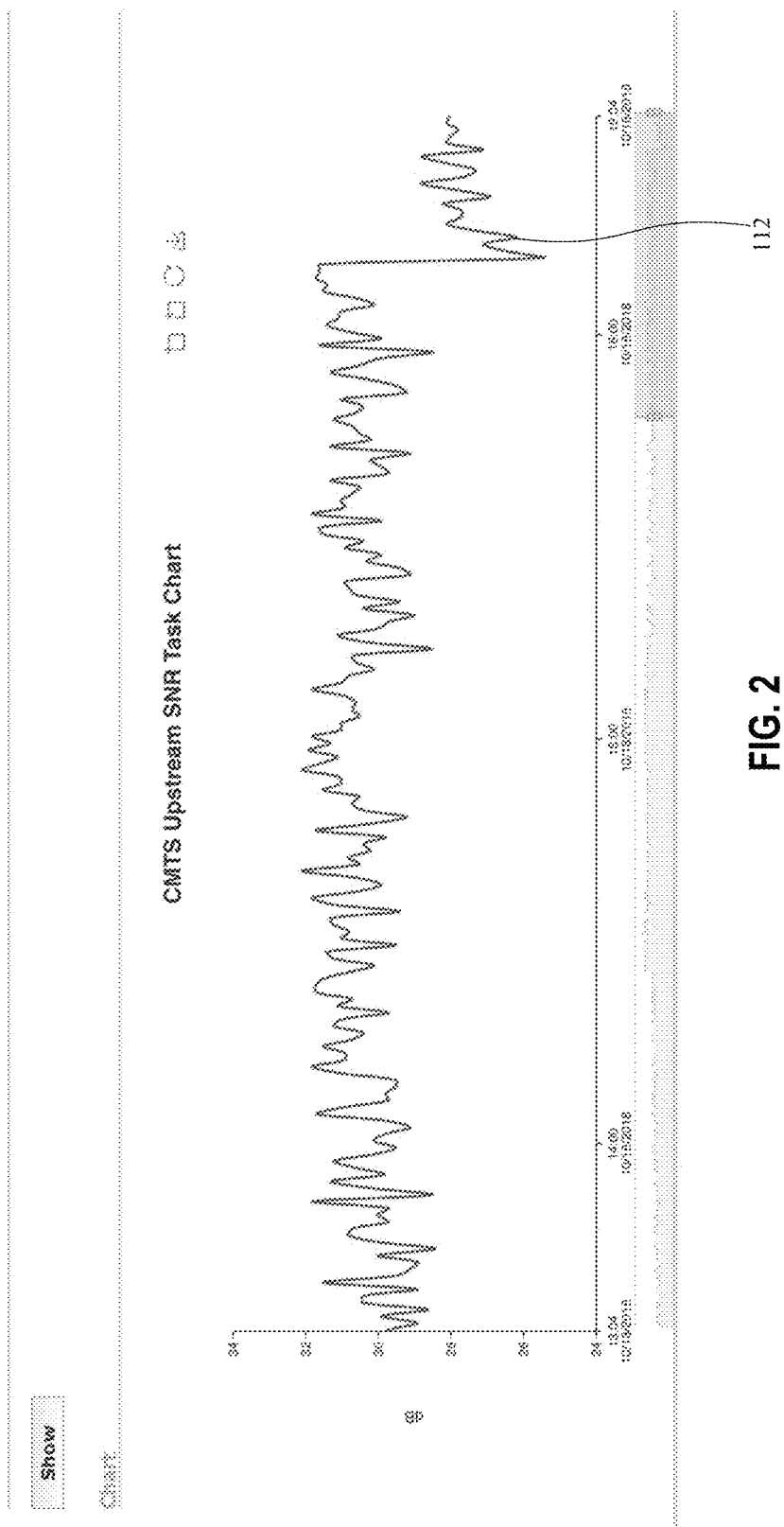
FIG. 2 illustrates a channel experiencing network degradation, in accordance with some examples.

FIG. 2 illustrates the channel (corresponding to element 112) that has good SNR until 18:20 (pm), after which the SNR drops.

Figure 3:
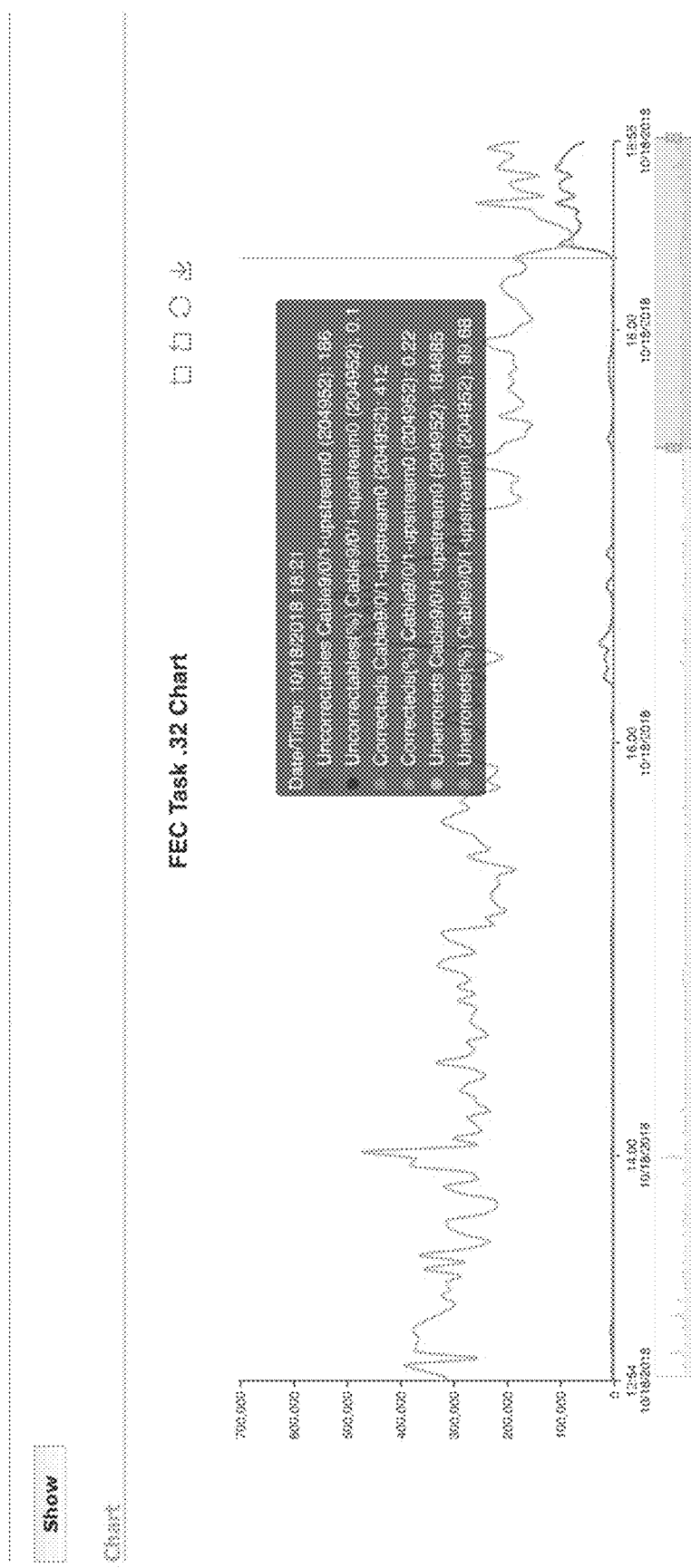
FIG. 3 illustrates historical data for the upstream channel experiencing network degradation, in accordance with some examples.

FIG. 3 illustrates historical data for the upstream channel (corresponding to element 112). Just before 18:20, the Forward Error Correction (FEC) is reasonable, uncorrected packets are 99.68%, corrected packets are 0.22%, and uncorrectable 0.1%.

Figure 4:
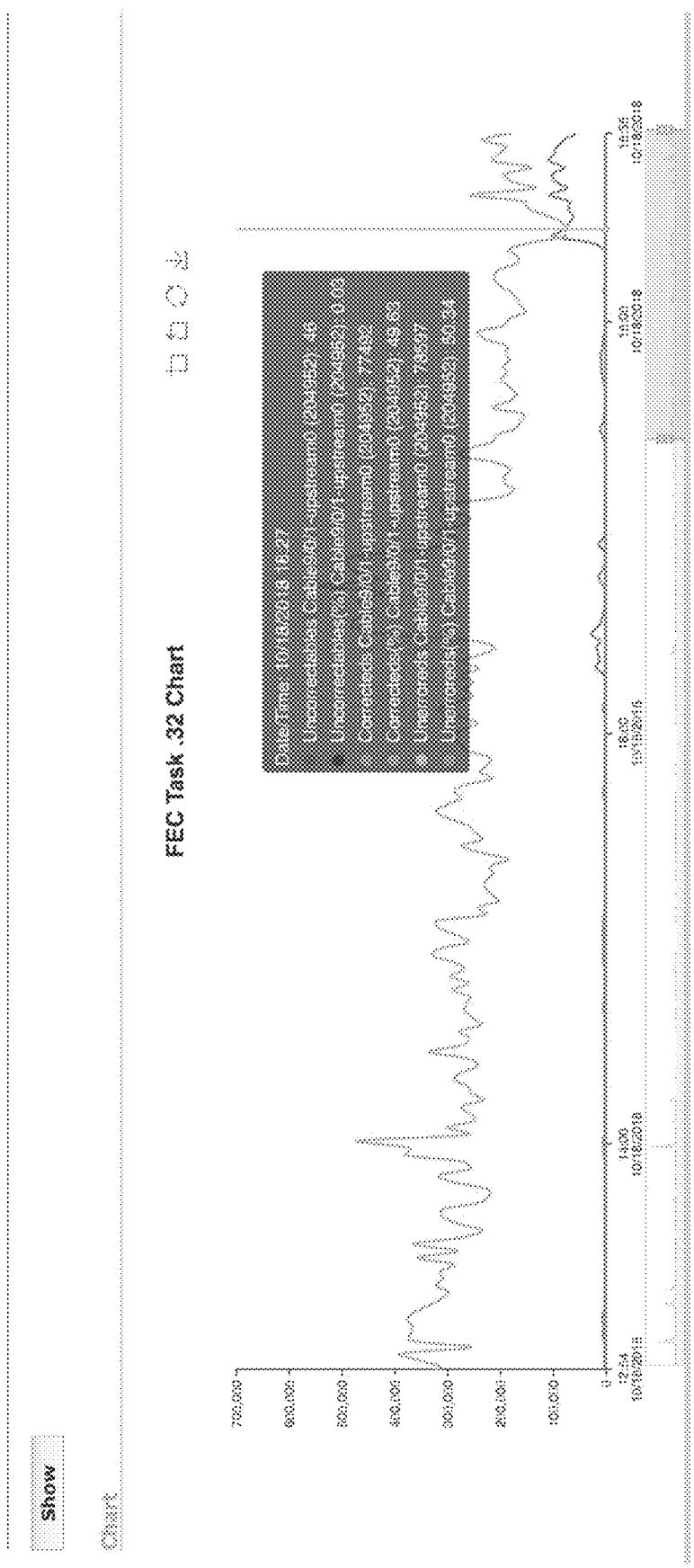
FIG. 4 illustrates historical data for the upstream channel experiencing network degradation, in accordance with some examples.

FIG. 4 illustrates historical data for the upstream channel (corresponding to element 112), including the FEC parameters after the noise appears. Uncorrected packets are 50.34%, corrected packet 49.63%, and uncorrectable 0.03%.

Figure 5:
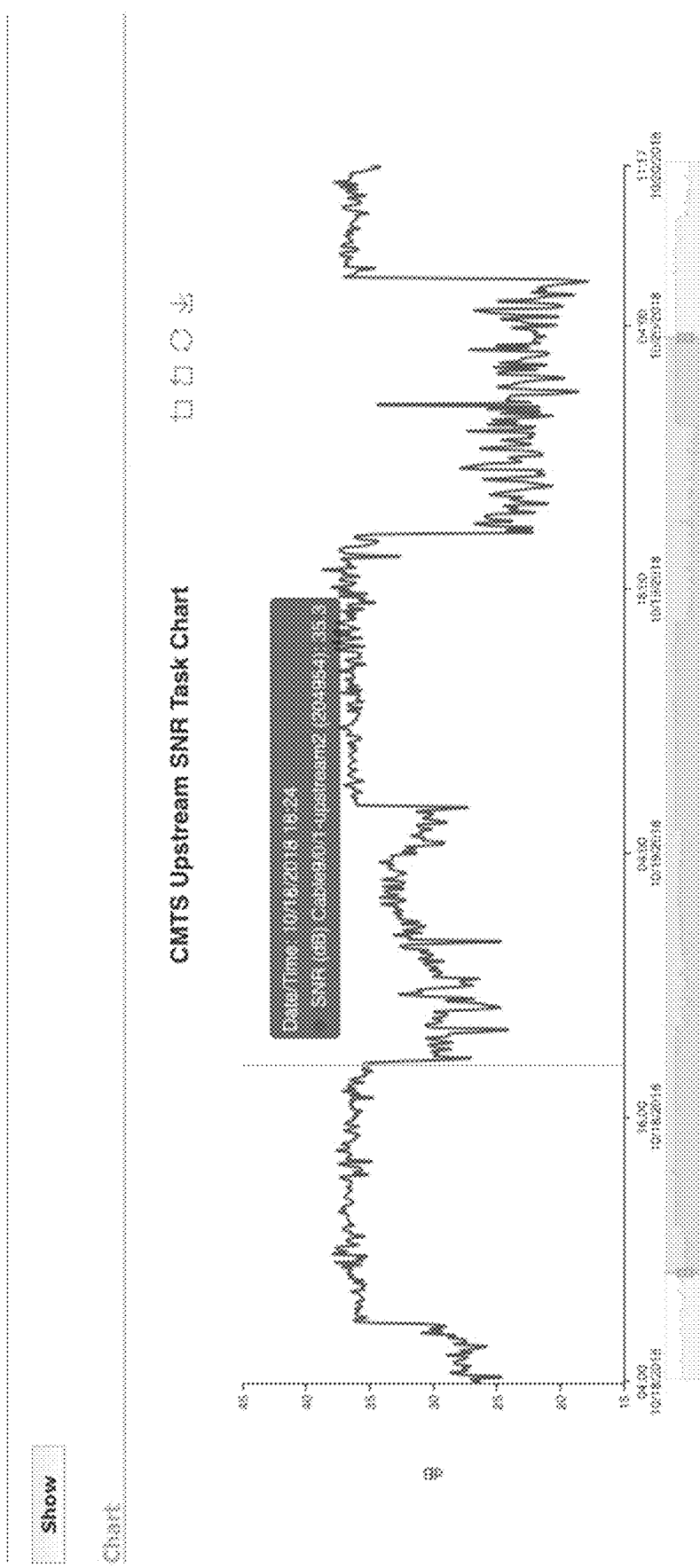
FIG. 5 illustrates SNR for the channel experiencing network degradation, in accordance with some examples.

FIG. 5 illustrates the SNR graph for the channel (corresponding to element 112) for the period of Oct. 18, 2018-4:00 am to Oct. 20, 2018-11:17 am. The noise appears around sunset and disappears around sunrise.

Figure 6:
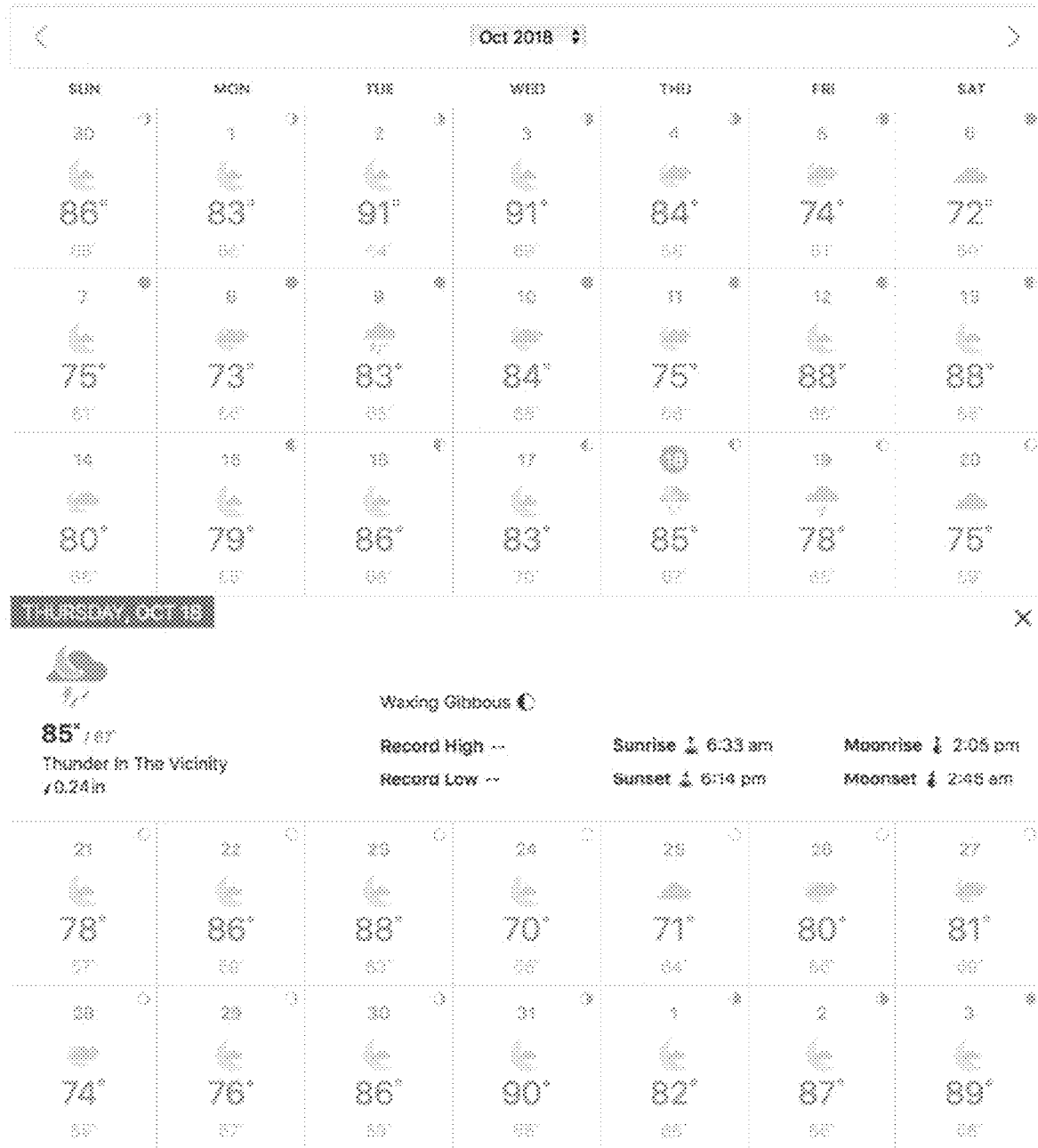
FIG. 6 illustrates sunrise and sunset time for the month of October for the location of the cable network analyzed in FIGS. 1-5.

FIG. 6 illustrates the sunrise and sunset time for the month of October for the location (Campinas, Brazil) of the cable network analyzed in FIGS. 1-5.

The technique analyzes the historical network performance data and correlates it with external/environmental events to help the operator to find the root cause of the noise, which in this example was a defective gas-discharge street light causing noise from sunset to sunrise every day. The external/environmental events are optionally used to identify the types and location of impairments and to determine the severity of impairments (e.g., impairments impacting more CPEs and/or customers may be more severe, impairments that cause CPEs to disconnect may be more severe than those that cause CPEs to remain connected bit have reduced performance).

Figure 7:
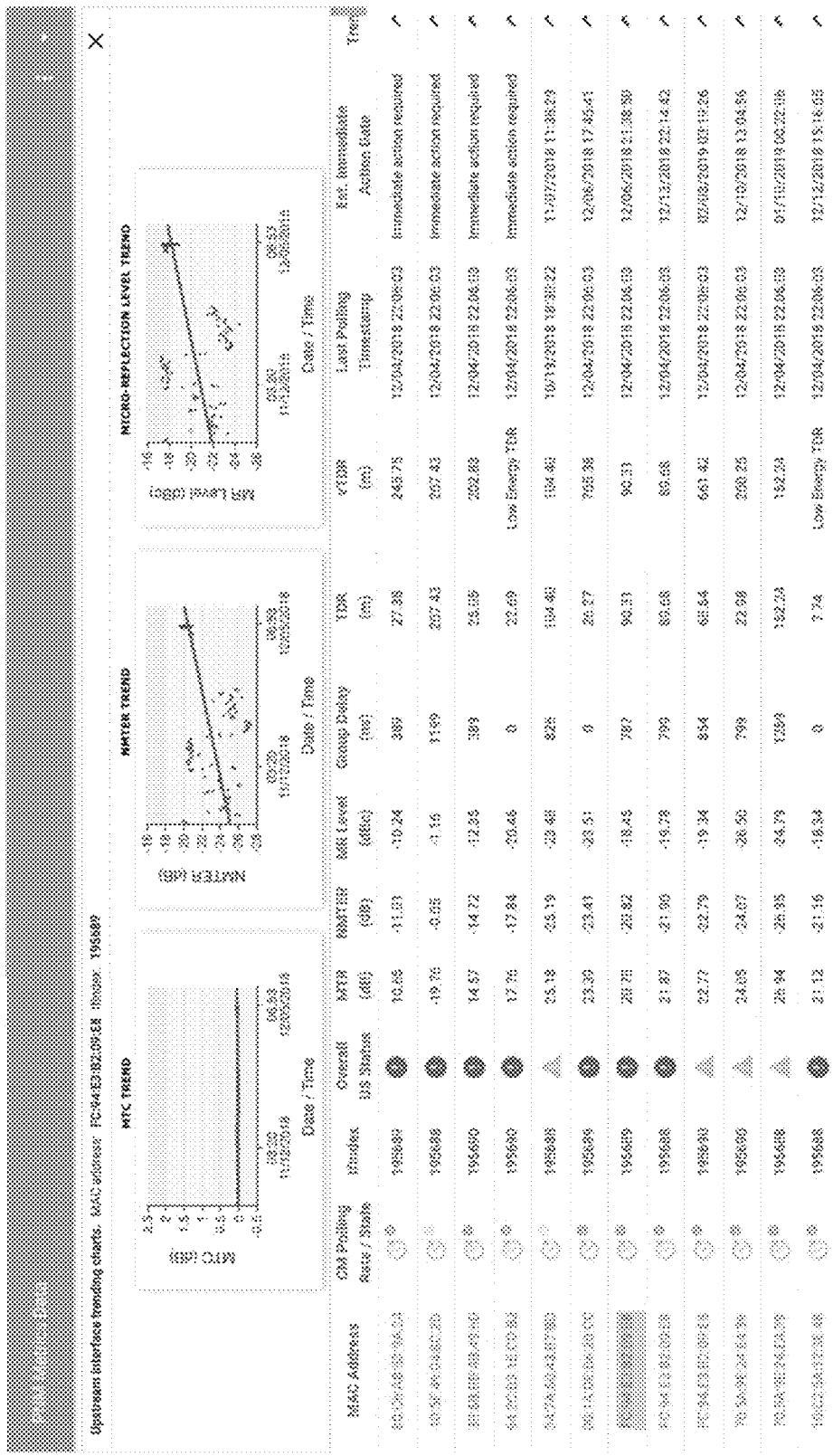
FIGS. 7-9 illustrates the effects of an impairment on three modems.
Figure 8:
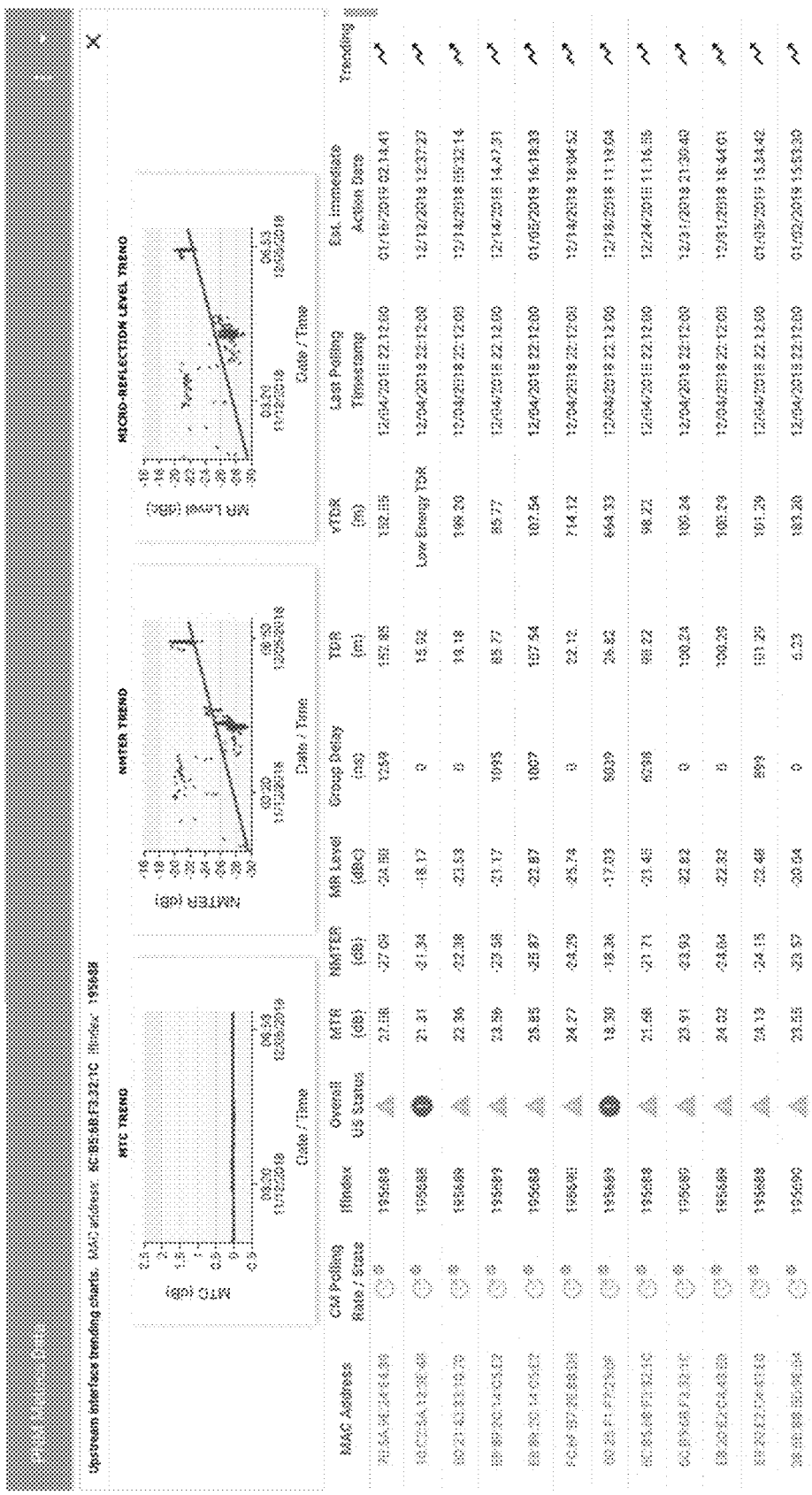
Figure 9:
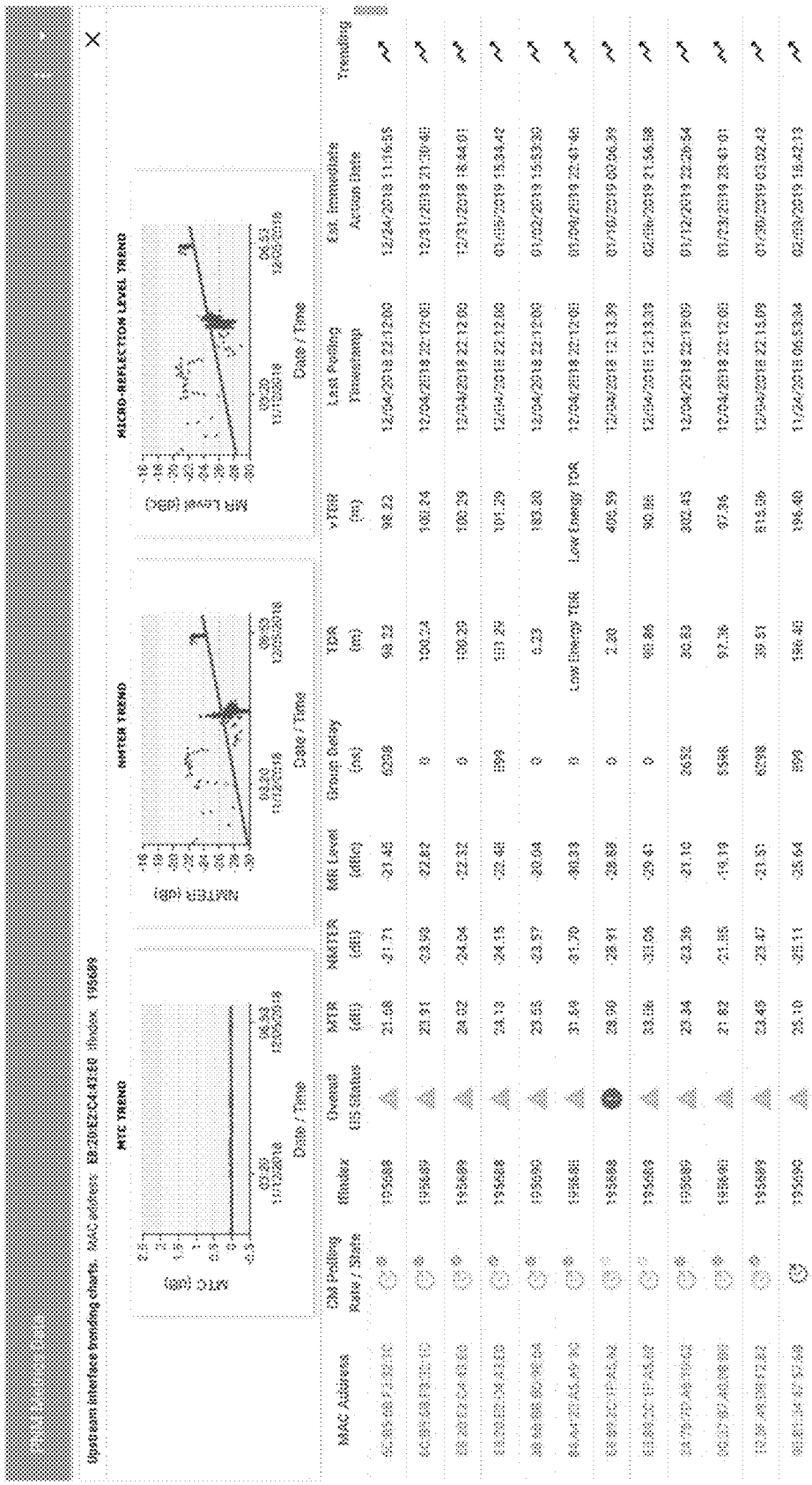
Figure 10:
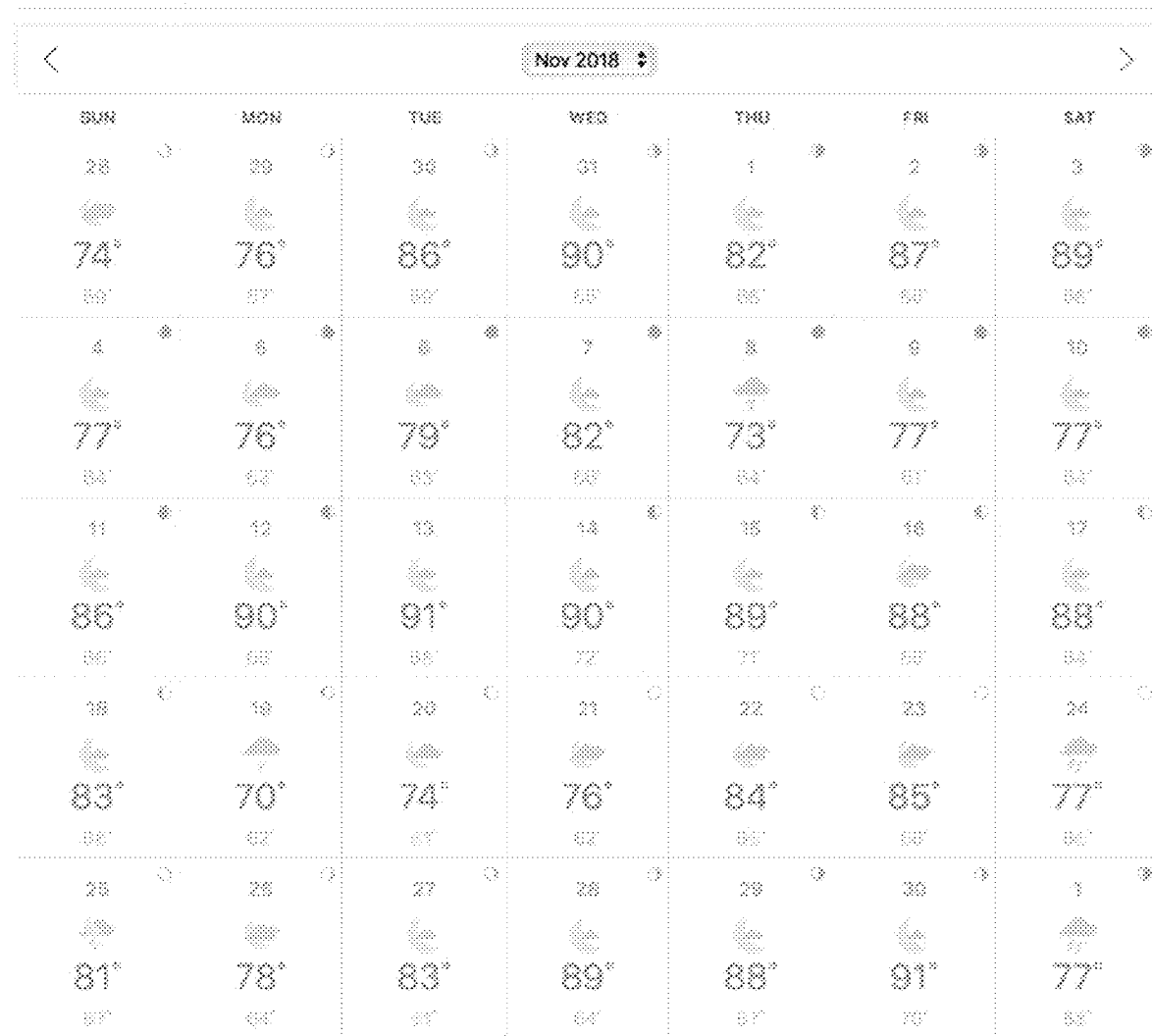
FIG. 10 illustrates the temperature and weather during the time period for FIGS. 7-9.

FIGS. 7-9 illustrate the results for three modems, in a node, that are affected by an impairment. This impairment is causing micro-reflections. The upper right graph in these pictures shows the variation of the micro-reflection in time for each modem. The graph shows from November 11 to November 17 the micro-reflection level has increased by 4 to 6 dBc, which is significant. FIG. 10 shows the location temperature weather during this time period.

The technique analyzes the historical network performance data and correlates it with external/environmental events to help the operator to find the root cause of the noise. In this example, the technique enables the operator to schedule a maintenance before the next heatwave arrives to this location, thereby reducing the likelihood of network degradation caused by the corresponding impairment in the network.

Figure 11:
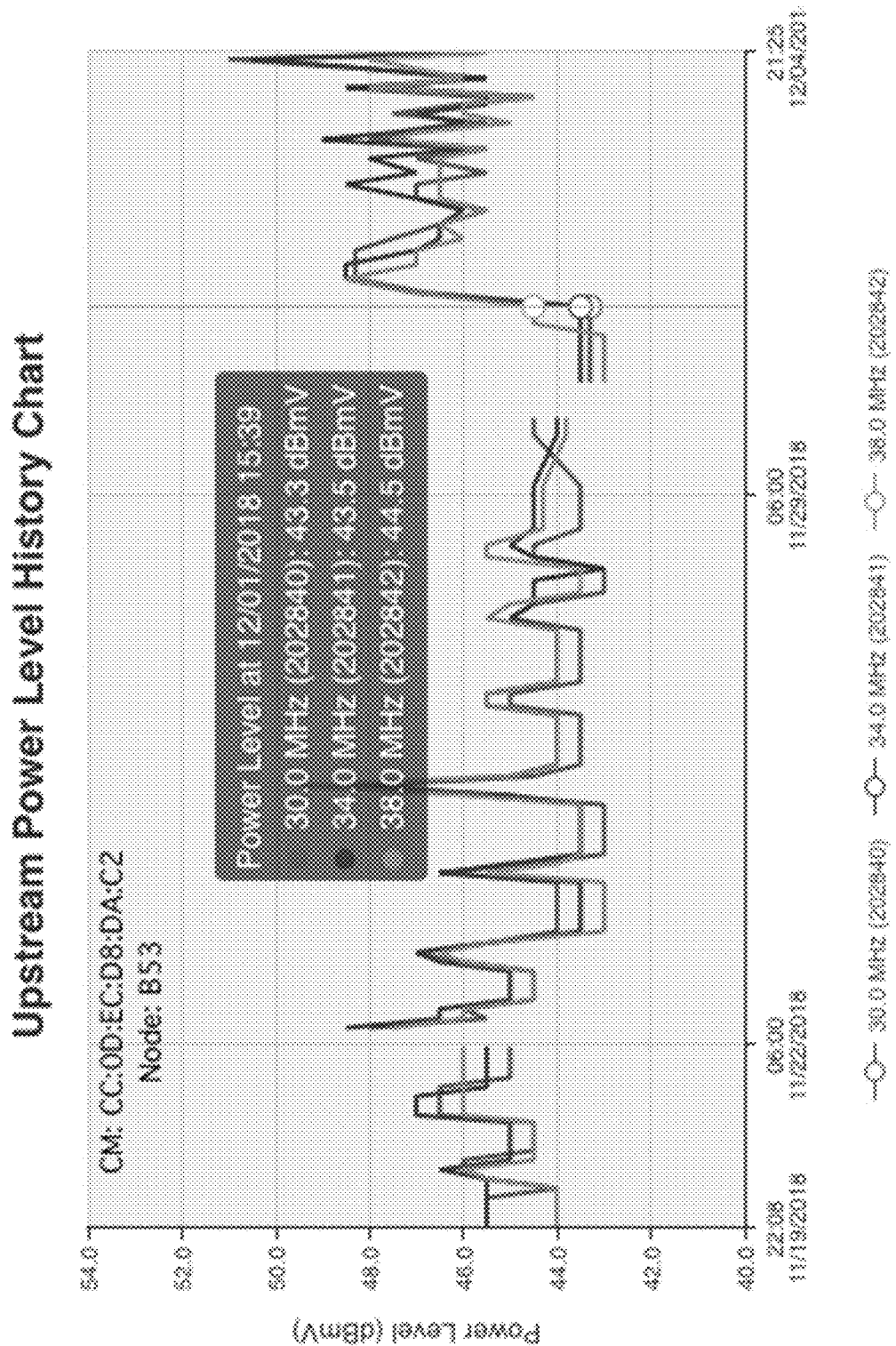
FIGS. 11-13 illustrate the upstream for three modems in a node.
Figure 12:
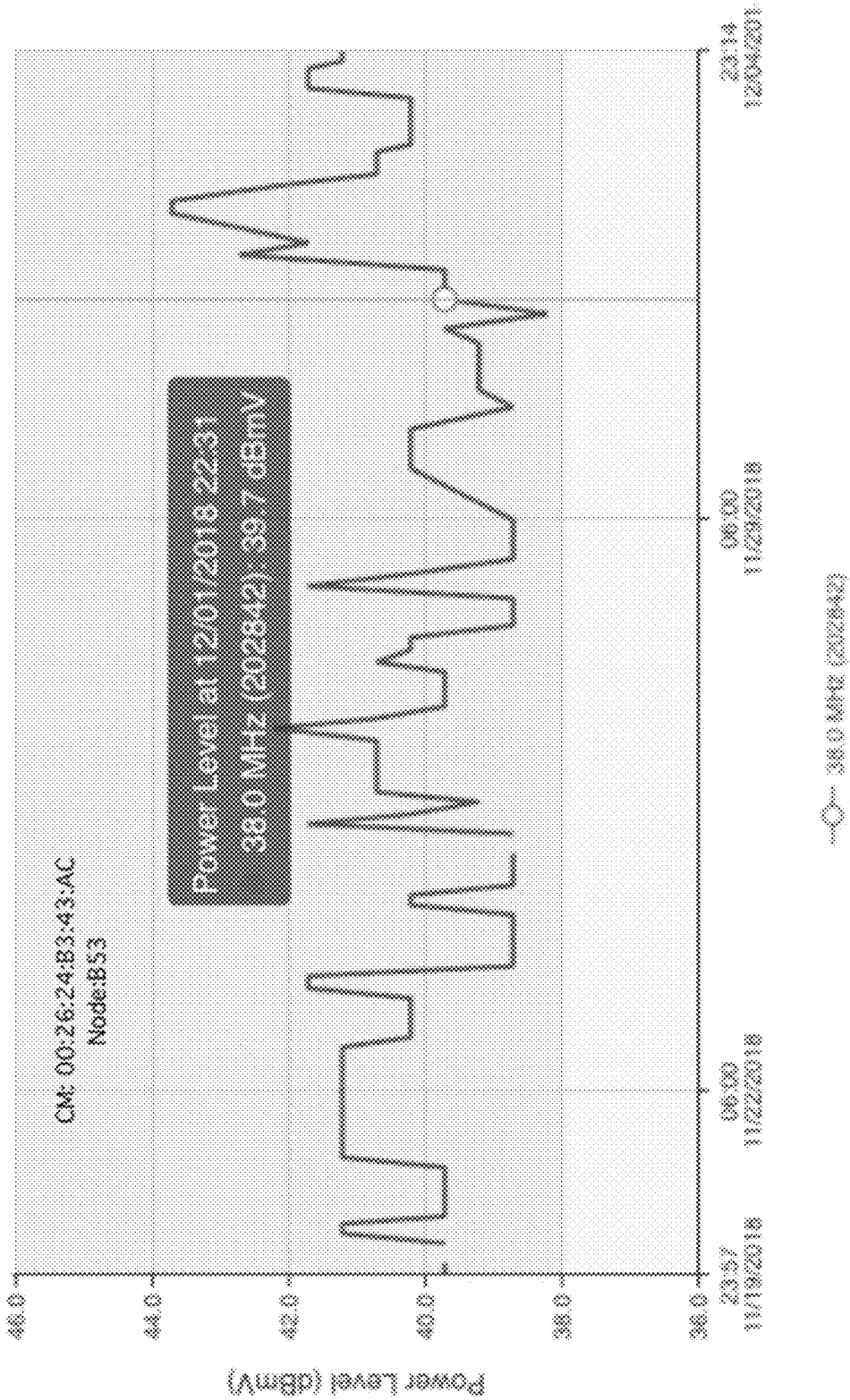
Figure 13:
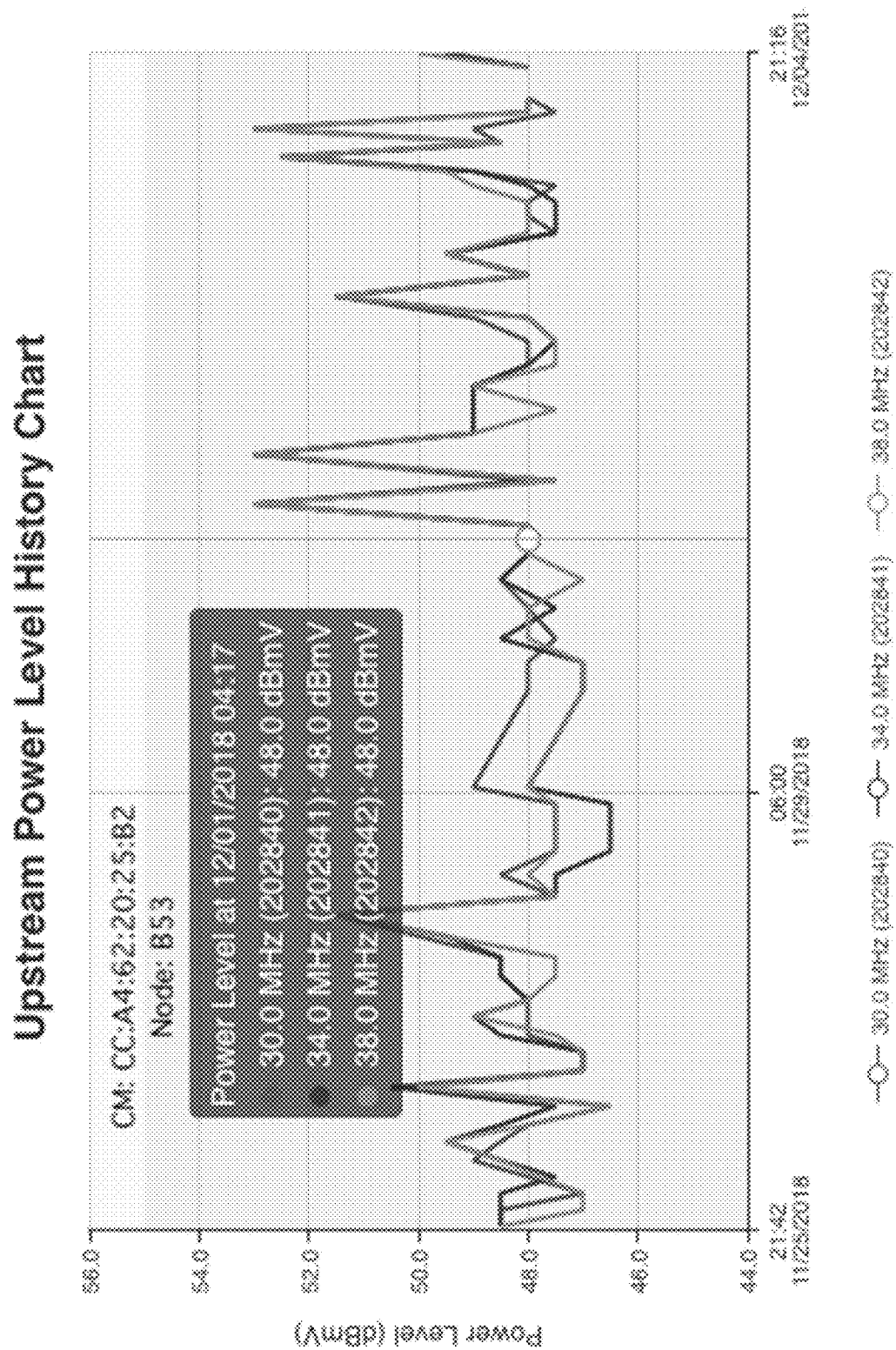

FIGS. 11-13 illustrate the Upstream for three modems in a node. The weather conditions for December 1 included rain, which corresponds to the upstream levels increasing after December 1. The upstream levels increasing is indicative of an impairment that is affected by rain. In this example, the technique enables the operator to schedule a maintenance before the next rainfall arrives at this location, thereby reducing the likelihood of network degradation caused by the corresponding impairment in the network.

Figure 14:
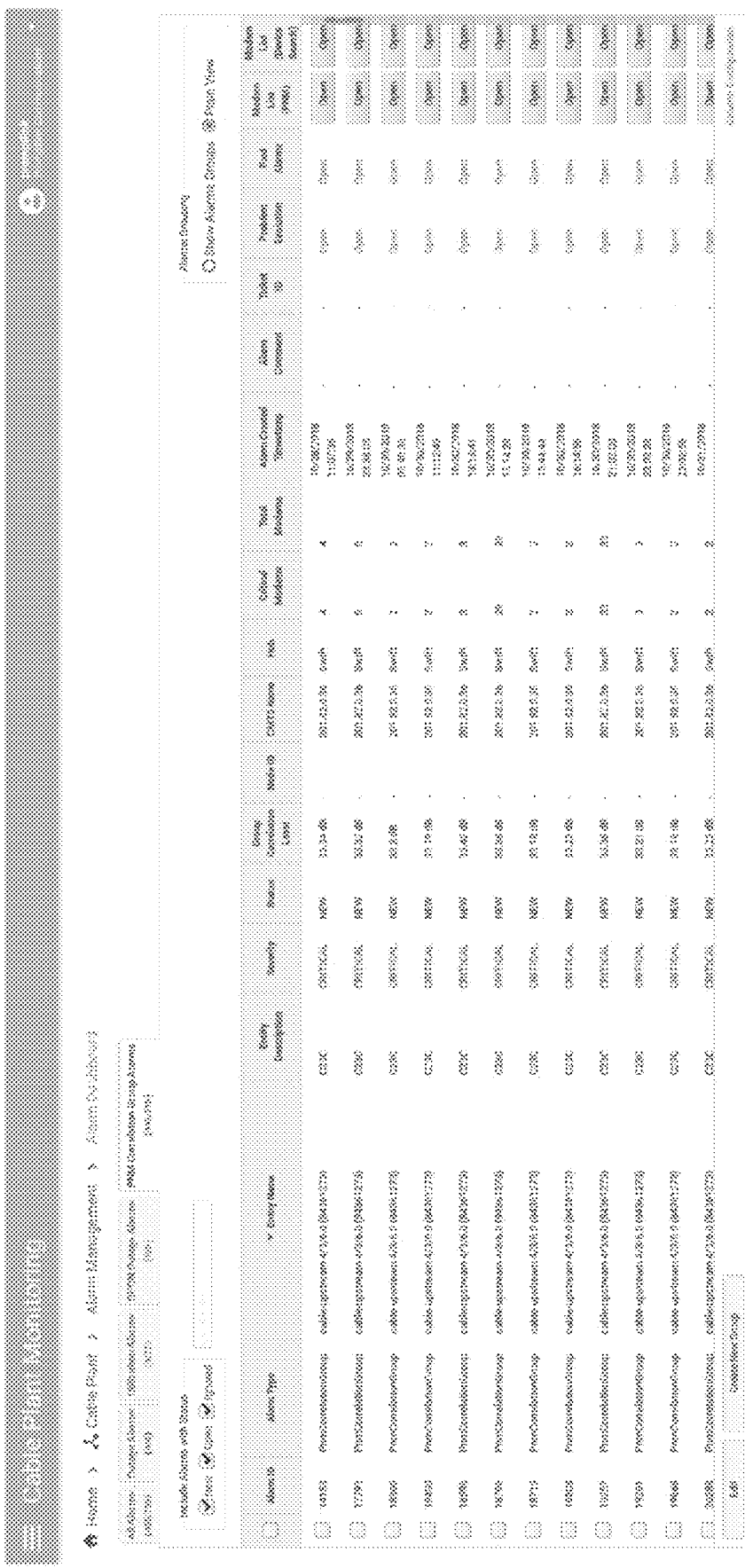
FIGS. 14-15 illustrate a dashboard.
Figure 15:
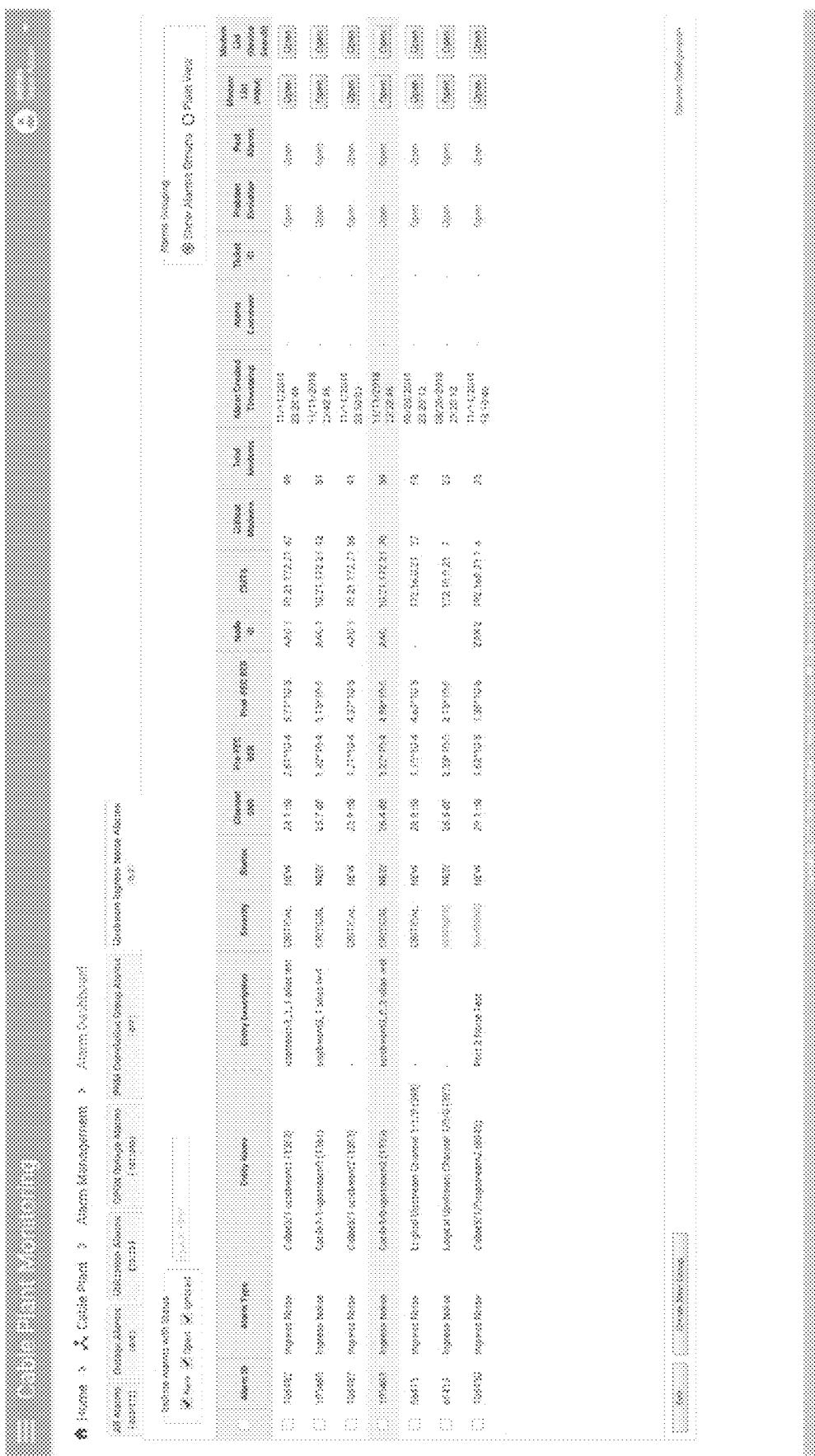

FIGS. 14-15 illustrate a dashboard, which displays network information and notifies the operator in response to a determination that an impairment has been detected in the network. In some examples, each identified impairment corresponds to an alarm in the dashboard. The alarms correspond to outages, utilization, proactive network maintenance (PNM), and noise detection/localization. Each alarm includes display of how many CPEs and/or customers are affected by the corresponding impairment. Outage alarms are generally categorized as the most urgent, followed by noise alarms, and then PNM alarms. However, the number of CPEs affected by each impairment is further used to prioritize which impairments to address (e.g., in which order, with what priority, with which personnel such as more experienced personnel).

Further, the technique is configurable to monitor certain parameters and to generate alarms and a corresponding notification if an impairment is detected, such as illustrated in FIGS. 1-6. For example, the technique monitors Upstream SNR or FEC.

Further, the technique tracks certain parameters, such as upstream and downstream power levels and SNR as well as PNM parameters, for each CPE. This historical data is also optionally used along with trend analyses to prioritize which impairment to address (e.g., in which order, with what priority, and with which personnel (such as more experienced personnel)).

The external/environmental information will be used in multiple ways, including: (1) to help identify the types and location of impairments and (2) to prioritize which impairment may cause more impact on the CPEs. This information will be fed into the alarm dashboard.

Figure 16:
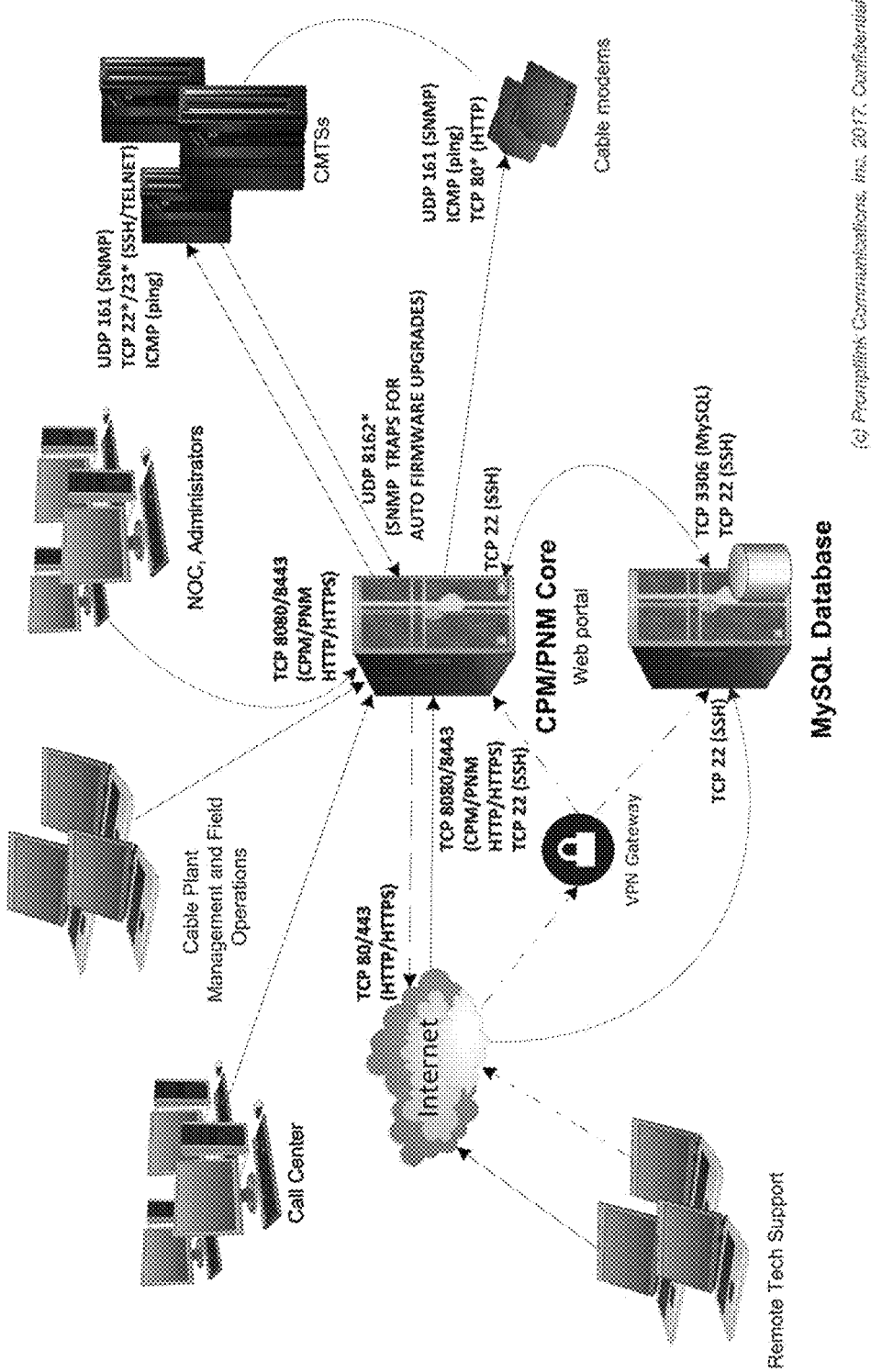
FIG. 16 illustrates an exemplary system architecture.

FIG. 16 illustrates an exemplary system architecture, including an electronic device that (1) receives various environmental parameters, (2) receives CPE parameters, (3) determines and monitors network impairments, (4) generates and displays alarms, (5) prioritizes network impairments, and (6) generates (e.g., transmits) notifications. The electronic device includes one or more processors and memory, which stores instructions for performing the techniques described. In some embodiments, the electronic device includes a display. The techniques described can also be stored on a transitory or non-transitory computer-readable storage medium as computer instructions that can be executed by an electronic device.

Figure 17:
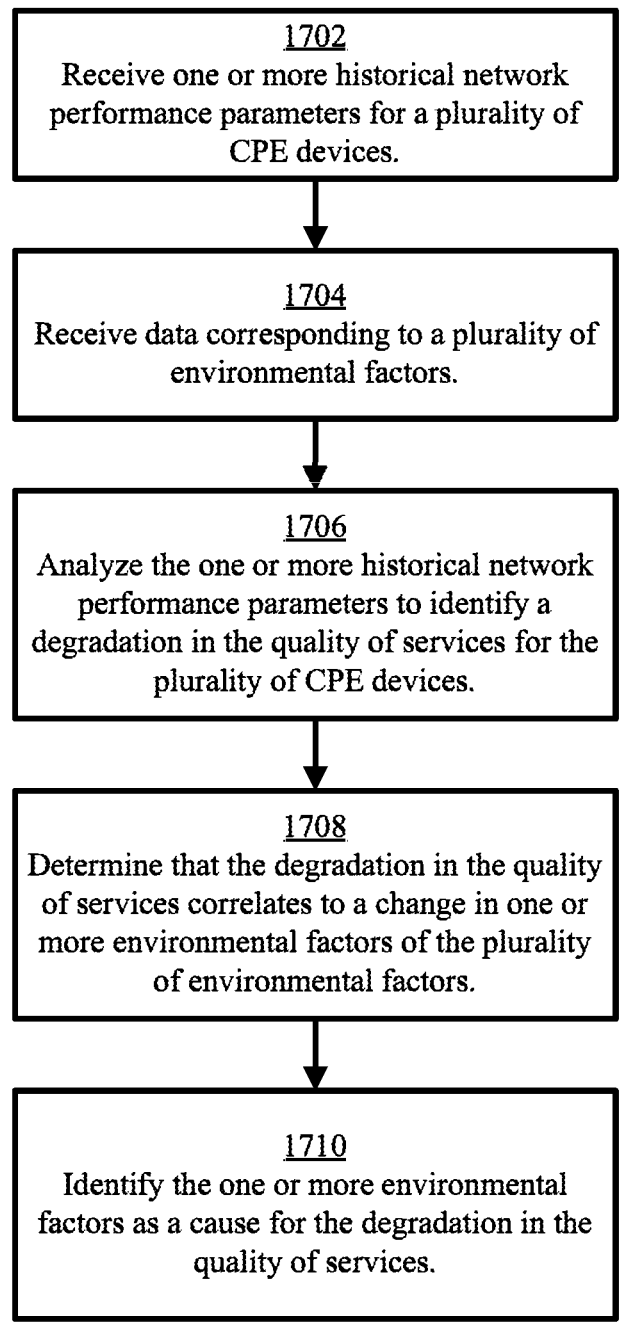
FIG. 17 illustrates an exemplary technique for identifying a cause of an impairment in a network.

FIG. 17 illustrates an exemplary technique for identifying a cause of an impairment in a network. In some embodiments, the technique is performed by an electronic device. In some embodiments, the technique is stored as computer-executable instructions on a (transitory or non-transitory) computer-readable storage medium. The order of the steps can be changed, one or more steps of the process can be omitted, and additional steps can be added.

At block 1702, the electronic device receives one or more historical network performance parameters for a plurality of CPE devices of a geographical location. The one or more historical network performance parameters correspond to particular days and/or times (which the device also receives). In some examples, the historical network performance parameters correspond to a duration of time (e.g., a day, a week, a month).

At block 1704, the electronic device receives data corresponding to a plurality of environmental factors for the geographical location. The plurality of environmental factors for the geographical location correspond to the (same) particular days and/or times. In some examples, the data corresponding to the plurality of environmental factors correspond to the same duration of time (e.g., a day, a week, a month) as the historical network performance parameters.

At block 1706, the electronic device analyzes the one or more historical network performance parameters to identify a degradation in the quality of services for the plurality of CPE devices. In some examples, the degradation is a decrease in SNR. In accordance with a determination that the one or more network performance parameters meet a set of degradation conditions (e.g., exceeds a threshold limit, does not exceed a threshold minimum, drops more than a certain amount (certain value or certain percentage)), the technique identifies that a degradation in the quality of services has occurred for the plurality of CPE devices (e.g., at the time in the historical network performance parameter data corresponding to meeting the set of conditions). In accordance with a determination that the one or more network performance parameters do not meet the set of degradation conditions (e.g., do not exceed the threshold limit, do exceed a threshold minimum, do not drop more than the certain amount (certain value or certain percentage)), the technique identifies that a degradation in the quality of services has not occurred for the plurality of CPE devices (e.g., at the time in the historical network performance parameter data corresponding to meeting the set of conditions).

At block 1708, the electronic device determines that the degradation in the quality of services correlates to a change in one or more environmental factors of the plurality of environmental factors for the geographical location. For example, the technique makes the determination of correlation based on the time/date/location of the change in the one or more historical network performance parameters matching or being within respective thresholds of the time/date/location of the one or more environmental factors. Some of the plurality of environmental factors may be identified as correlating to the degradation in the quality of services while other environmental factors may not be identified as correlating to the degradation in the quality of services.

At block 1710, the electronic device identifies (e.g., in response to the determination that the degradation in the quality of services correlates to a change in one or more environmental factors of the plurality of environmental factors for the geographical location) the one or more environmental factors as a cause for the degradation in the quality of services. Thus, those environmental factors that correlate to the degradation in the quality of services are identified as a cause for the degradation in the quality of services. Generally, the environmental factors/conditions are not the root cause of the impairment. For example, the impairments may exist independent of the environmental factors, yet the changes in the environmental conditions causes the impairment to degrade (or further degrade) the quality of services on the network. For example, the impairment may be a broken connector. The broken connector may cause a slight degradation in the quality of services, regardless of the environmental conditions (e.g., weather). However, the environmental conditions, such as rain, can cause this impairment (the broken connector) to become more severe and result in a significant degradation in the quality of services. If there is rain in the forecast, there are benefits to prioritize the fixing of this impairment (the broken connector) as compared to other impairments that may not be exacerbated by the rain the forecast.

In some examples, the device determines that the degradation in the quality of services does not correlate to the change in the plurality of environmental factors (or other environmental factors) and, in response, forgoes identifying the one or more environmental factors (or other environmental factors) as the cause for the degradation in the quality of services. Thus, the technique can analyze various environmental factors and determine which environmental factors, if any, are a cause for the degradation in the quality of services and which environmental factors, if any, are not a cause for the degradation in the quality of services.

In accordance with some embodiments, determining that the degradation in the quality of services correlates to the change in the one or more environmental factors includes determining that the degradation in the quality of services occurred within a predetermined time of the change in the one or more environmental factors. For example, the technique identifies correlation based on a duration of time between the change in the environmental factor and the degradation in the quality of service. In accordance with a determination that an environmental factor changed within the predetermined period of time that the quality of service degraded, the technique identifies the change in the environmental factor as being correlated with the degradation in the quality of services. In accordance with a determination that the environmental factor did not change within the predetermined period of time that the quality of service degraded, the technique does not identify the change in the environmental factor as being correlated with the degradation in the quality of services.

In accordance with some embodiments, determining that the degradation in the quality of services correlates to the change in the one or more environmental factors includes determining that the degradation in the quality of services corresponds in time to the change in the one or more environmental factors.

In accordance with some embodiments, analyzing the one or more historical network performance parameters to identify a degradation in the quality of services for the plurality of CPE devices includes: calculating an average network performance parameter for the plurality of CPE devices; and determining that the average network performance parameter for the plurality of CPE devices is below a performance threshold. In accordance with a determination that the average network performance parameter for the plurality of CPE devices is below a performance threshold, the technique determines that the quality of services has degraded. In accordance with a determination that the average network performance parameter for the plurality of CPE devices is not below the performance threshold, the technique determines that the quality of services has not degraded.

In some embodiments, analyzing the one or more historical network performance parameters to identify a degradation in the quality of services for the plurality of CPE devices includes: determining that a network performance parameter for each of plurality of CPE devices is below a CPE performance threshold. In accordance with a determination that a network performance parameter for a first CPE device is below a performance threshold, the technique determines that the quality of services has degraded for the first CPE device. In accordance with a determination that the network performance parameter for the first CPE device is not below the performance threshold, the technique determines that the quality of services has not degraded for the first CPE device. The technique optionally performs the analysis for the plurality of CPE devices.

In some embodiments, prior to receiving the data corresponding to the plurality of environmental factors for the geographical location, the device requests, based on the particular days or times, data for the plurality of environmental factors for the geographical location.

In some embodiments, the device displays an alarm including an indication of the number of CPE devices affected by the degradation in the quality of services.

In some embodiments, the device displays an alarm indicating that the one or more environmental factors (and/or which of the environmental factors) is a cause for the degradation in the quality of services.

In some embodiments, the one or more environmental factors for the geographical location is selected from a group comprising: environmental temperature, rainfall, sunrise, and sunset. In some examples, the one or more environmental factors include all of temperature, rainfall, sunrise, and sunset.

Various techniques for prioritization of network maintenance are described. In some embodiments, the technique is performed by an electronic device. In some embodiments, the technique is stored as computer-executable instructions on a (transitory or non-transitory) computer-readable storage medium. The order of the steps can be changed, one or more steps of the process can be omitted, and additional steps can be added.

In some embodiments, the impairment that causes the degradation in the quality of services is categorized into one of three categories: (a) impairments causing outages, (b) impairments causing service degradation that, if not fixed, will (likely/possibly) cause outages (and create customer dissatisfaction), such as, for example, micro-reflection due to a broken or corroded corrector or a bent or crushed cable, and (c) noise impairments. For example, in a network of 500,000 cable modems, it is possible to detect some 2,000 or more service degrading impairments, which operators want to fix as part of the Proactive Network Maintenance initiatives.

In some embodiments, the technique prioritizes impairments based on categorization of the impairment. Outage impairments are assigned a higher priority (e.g., the highest priority) than non-outage impairments, as outage impairments should be fixed quickly. For example, the technique may issue a high priority alert when an outage impairment is detected.

It is beneficial to also prioritize service degrading impairments, though they are lower in priority than outage impairments. To prioritize such impairments, the technique considers one or more of the following prioritization factors: the number of modems affected by the impairment, the severity of the impairment (e.g., is it a 10% drop in bandwidth or a 90% drop in bandwidth, is a drop in SNR above or below a threshold amount), the persistence of the impairment, the health of a node, and correlation between the PNM impairments (micro-reflection, etc.) and Noise. Thus, in example examples, the technique analyzes one or more of the prioritization factors to determine priority for the impairment and issues a corresponding alert.

In general, the more modems that are affected, the higher the priority that is assigned to the impairment. For example, when less than a threshold amount of modems are affected, the priority is increased by a first value (e.g., one level). When more than the threshold amount of modems are affected but less than a second threshold amount of modems, the priority is increased by a second value (e.g., two levels) different from the first value. When more than the second threshold amount of modems is affected, the priority is increased by a third value (e.g., three levels) different from the first and second values. Thus, the number of modems affected is reflected in the priority the technique assigns to the impairment.

In some embodiments, the more severe the impairment, the higher the priority that is assigned to the impairment. For example, when the severity of the impairment is less than a threshold impairment level, the priority is increased by a first value (e.g., one level). When the severity of the impairment is more than the threshold impairment level, the priority is increased by a second value (e.g., two levels). Thus, the severity of the impairment is reflected in the priority the technique assigns to the impairment.

In some embodiments, the more persistent the impairment, the higher the priority that is assigned to the impairment. For example, some impairments, such as noise, may come and go. Persistence is optionally based on how often the impairment affects the network (e.g., as a percentage of time), how frequently the impairment comes and goes, and how long (e.g., on average) the impairment remains once the impairment occurs. For example, when the persistence of the impairment is less than a threshold persistence level, the priority is increased by a first value (e.g., one level). When the persistence of the impairment is more than the threshold persistence level, the priority is increased by a second value (e.g., two levels). Thus, the persistence of the impairment is reflected in the priority the technique assigns to the impairment.

In some embodiments, the lower the health of a corresponding node, the higher the priority that is assigned to the impairment. In some examples, the health of a node is based on the number of impairments (e.g., over a duration of time, concurrently) a node is experiencing. The higher the number of impairments, the lower the health of the node. When the health of the node is more than a threshold health level, the priority is increased by a first value (e.g., one level). When the health of the node is less than the threshold health level, the priority is increased by a second value (e.g., two levels). Thus, the health of the corresponding node is reflected in the priority the technique assigns to the impairment.

In some embodiments, the higher the correlation between PNM impairments (e.g., micro-reflection) and Noise, the higher the priority that is assigned to the impairment. For example, the PNM impairment may also be causing noise to enter the network (e.g., a loose connector). When the correlation between PNM impairments and Noise is less than a threshold correlation amount, the priority is increased by a first value (e.g., one level). When the correlation between PNM impairments and Noise is more than the threshold correlation amount, the priority is increased by a second value (e.g., two levels). Thus, the correlation between PNM impairments and Noise is reflected in the priority the technique assigns to the impairment.

In some embodiments, the technique issues an alert (e.g., an audio alert, a text message) based on the priority of the impairment, as determined based on one or more (or all) of the above-described prioritization factors.

In some embodiments, network maintenance is prioritized based on weather forecast. The device accesses a plurality of items corresponding to network maintenance tasks, the plurality of items including a first item corresponding to a first network maintenance tasks and a second item corresponding to a second network maintenance task different from the first network maintenance task. The device receives a weather forecast. The device prioritizes, based on the weather forecast, the plurality of items corresponding to network maintenance tasks. In some embodiments, the prioritization of the network maintenance task is in accordance with the priority of the impairment to which the task corresponds.

In some embodiments, the technique requests the weather forecast for a geographical location of a network. In some embodiments, the network maintenance tasks correspond to tasks in the network, such as repair or replacement of a network component.

The foregoing description has been described with reference to specific embodiments. However, the illustrative discussions above are not intended to be exhaustive or to limit the invention to the precise forms described. Many modifications and variations are possible in view of the above teachings. Others skilled in the art are thereby enabled to best utilize the techniques and various embodiments with various modifications as suited to various uses.

Although the disclosure and examples have been described with reference to the accompanying drawings, it is to be noted that various changes and modifications will become apparent to those skilled in the art. Such changes and modifications are to be understood as being included within the scope of the disclosure.

What is claimed is:

1. A method, comprising:
   receiving a weather forecast for a geographic location that corresponds to a geographic location of a network that includes a plurality of CPE devices;
   accessing a plurality of network maintenance tasks associated with the plurality of CPE devices, wherein the plurality of network maintenance tasks are categorized into a plurality of categories, including a first category and a second category; and
   prioritizing a network maintenance task of the plurality of network maintenance tasks based on a set of one or more conditions, including the weather forecast and the category of the network maintenance task.

2. The method of claim 1, wherein the set of one or more conditions includes a quantity of CPE devices affected by the network maintenance task.

3. The method of claim 1, wherein the plurality of network maintenance tasks correspond to repair or replacement of one or more network components.

4. The method of claim 1, wherein the plurality of network maintenance tasks includes a first network maintenance task of a first category and a second network maintenance task, different from the first network maintenance task, of the second category.

5. The method of claim 4, wherein the first network maintenance task corresponds to a first impairment in the network with a first severity and the second network maintenance task corresponds to a second impairment in the network, different from the first impairment, that corresponds a second severity that is different from the first severity.

6. The method of claim 5, wherein the first severity is based on causing one or more network outages and the second severity is based on causing one or more service degradations that do not include network outages.

7. A non-transitory computer-readable storage medium storing one or more programs configured to be executed by one or more processors of a computer system, the one or more programs comprising instructions for:
   receiving a weather forecast for a geographic location that corresponds to a geographic location of a network that includes a plurality of CPE devices;
   accessing a plurality of network maintenance tasks associated with the plurality of CPE devices, wherein the plurality of network maintenance tasks are categorized into a plurality of categories, including a first category and a second category; and prioritizing a network maintenance task of the plurality of network maintenance tasks based on a set of one or more conditions, including the weather forecast and the category of the network maintenance task.

8. The non-transitory computer-readable storage medium of claim 7, wherein the set of one or more conditions includes a quantity of CPE devices affected by the network maintenance task.

9. The non-transitory computer-readable storage medium of claim 7, wherein the plurality of network maintenance tasks correspond to repair or replacement of one or more network components.

10. The non-transitory computer-readable storage medium of claim 7, wherein the plurality of network maintenance tasks includes a first network maintenance task of a first category and a second network maintenance task, different from the first network maintenance task, of the second category.

11. The non-transitory computer-readable storage medium of claim 10, wherein the first network maintenance task corresponds to a first impairment in the network with a first severity and the second network maintenance task corresponds to a second impairment in the network, different from the first impairment, that corresponds a second severity that is different from the first severity.

12. The non-transitory computer-readable storage medium of claim 11, wherein the first severity is based on causing one or more network outages and the second severity is based on causing one or more service degradations that do not include network outages.

13. A computer system, comprising:
one or more processors; and
a non-transitory computer-readable storage medium storing one or more programs configured to be executed by one or more processors of a computer system, the one or more programs comprising instructions for:
receiving a weather forecast for a geographic location that corresponds to a geographic location of a network that includes a plurality of CPE devices;
accessing a plurality of network maintenance tasks associated with the plurality of CPE devices, wherein the plurality of network maintenance tasks are categorized into a plurality of categories, including a first category and a second category; and
prioritizing a network maintenance task of the plurality of network maintenance tasks based on a set of one or more conditions, including the weather forecast and the category of the network maintenance task.

14. The computer system of claim 13, wherein the set of one or more conditions includes a quantity of CPE devices affected by the network maintenance task.

15. The computer system of claim 13, wherein the plurality of network maintenance tasks correspond to repair or replacement of one or more network components.

16. The computer system of claim 13, wherein the plurality of network maintenance tasks includes a first network maintenance task of a first category and a second network maintenance task, different from the first network maintenance task, of the second category.

17. The computer system of claim 16, wherein the first network maintenance task corresponds to a first impairment in the network with a first severity and the second network maintenance task corresponds to a second impairment in the network, different from the first impairment, that corresponds a second severity that is different from the first severity.

18. The computer system of claim 17, wherein the first severity is based on causing one or more network outages and the second severity is based on causing one or more service degradations that do not include network outages.

* * * * *